3 Sheets--Sheet 1.

C. M. CRANDALL.

Toy Building-Blocks.

No. 6,409. Reissued May 4, 1875.

Witnesses:
H. C. Mattmberg
Chas. Nida

Inventor:
Charles M. Crandall
per
Atty

3 Sheets--Sheet 2.

C. M. CRANDALL.

Toy Building-Blocks.

No. 6,409. Reissued May 4, 1875.

*Witnesses:*

H. C. Mattenberg

Chas. Nida

*Inventor:*

Charles M. Crandall per G. W. Singleton.

Atty

3 Sheets--Sheet 3.

C. M. CRANDALL.

Toy Building-Blocks.

Reissued May 4, 1875.

No. 6,409.

Witnesses:

H. C. Mattenberg

Chas. N. Lee

Inventor:

Charles M. Crandall per [illegible]

Atty

UNITED STATES PATENT OFFICE.

CHARLES M. CRANDALL, OF MONTROSE, PENNSYLVANIA, ASSIGNOR TO C. M. CRANDALL & CO., OF SAME PLACE.

IMPROVEMENT IN TOY BUILDING-BLOCKS

Specification forming part of Letters Patent No. 61,721, dated February 5, 1867; reissue No. 6,356, dated March 30, 1875; reissue No. 6,409, dated May 4, 1875; application filed April 26, 1875.

*To all whom it may concern:*

Be it known that I, CHARLES M. CRANDALL, of Montrose, in the county of Susquehanna and State of Pennsylvania, have invented a new and useful Improvement in Children's Toys; and that the following is a full, clear, and exact description of the same, reference being had to the accompanying drawings and to the letters of reference marked thereon, making a part of this specification.

This invention is in the nature of an improvement in children's toys; and the invention consists in children's toys constructed so that the several parts of the toy may be interchangeably fitted together, irrespective of position, size, or form, the several parts so fitted being united or adhering, forming a substantial fastening that may be easily put together and disconnected at pleasure, and so that the several parts may be arranged and united to represent buildings or figures of men, animals, &c.

Figure 1:
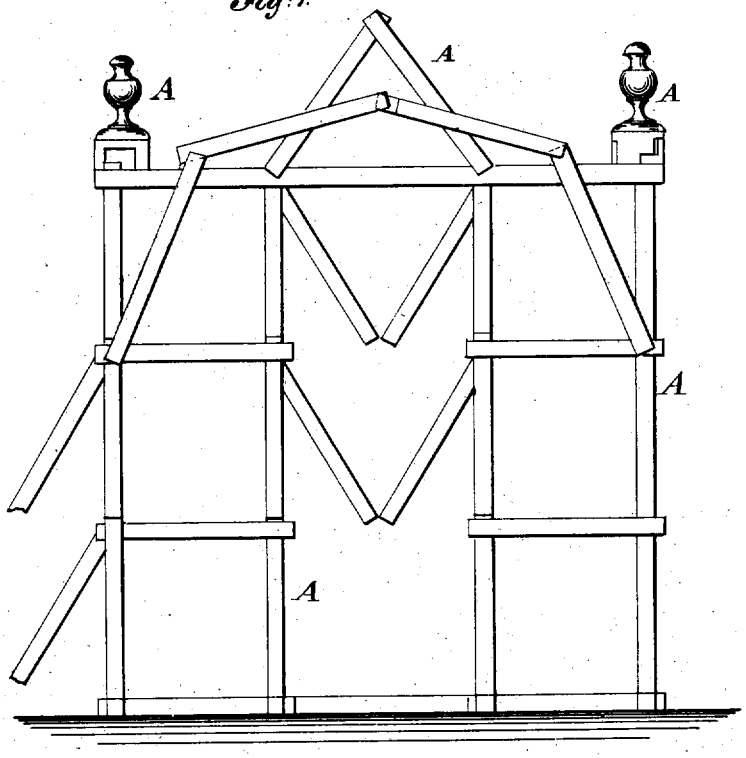
Figure 2:
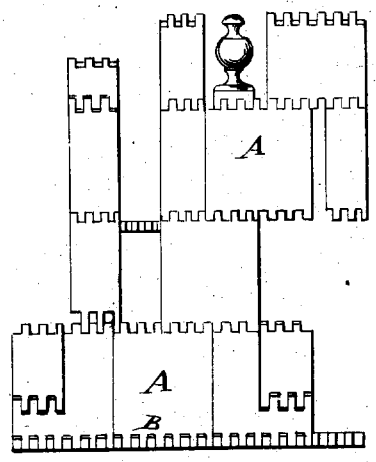
Figure 3:
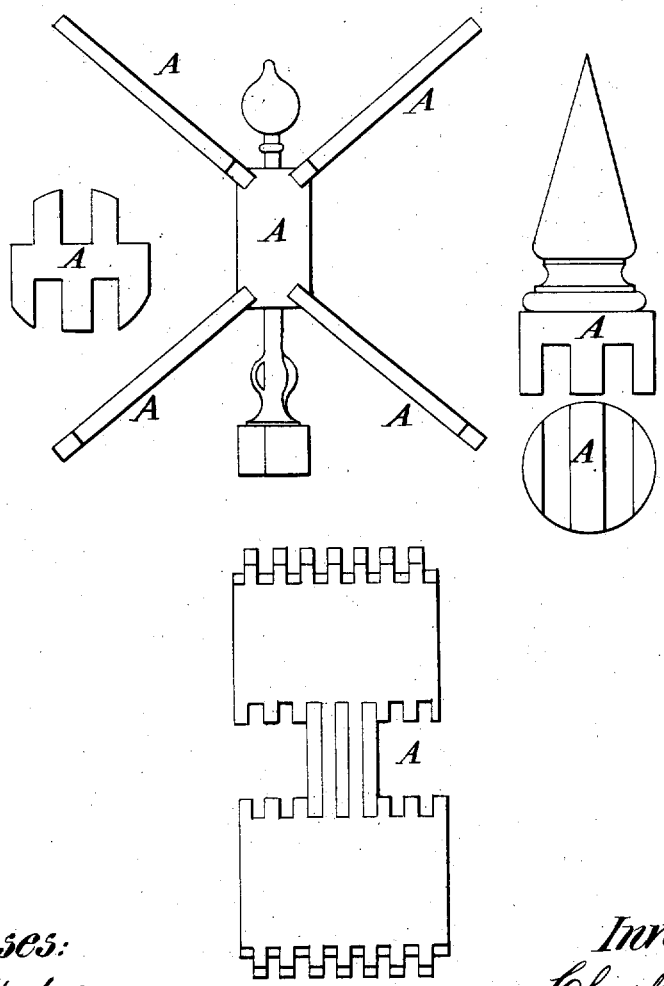

In the accompanying sheets of drawings, Figure 1 represents a front elevation of a playhouse made from these blocks; Fig. 2, a side elevation of same; and Figs. 3 and 4 represent different forms and manner of fitting the blocks together, showing how they may be combined to represent different figures and structures.

Similar letters of reference indicate like parts in the several figures.

A represents a block, which may be of any size and shape, and formed from any suitable material. The edges or ends, or, in fact, the entire surface of the block A, may be grooved, as shown at B, or indented or so formed that a part of one of the blocks or pieces will be received into a part of another of the blocks or pieces, and confined in any given position by the tight fitting, clamping, or friction between the parts so fitted, one within the other, as shown in Fig. 2, and the modifications in Figs. 3 and 4. These interchangeably-fitting parts may be formed directly into the edge, end, or surface of the blocks by sawing out or otherwise constructing recesses or clamps for the reception of the parts to be fitted; or, instead of so forming the clamps or interlocking portions, the blocks or several pieces of the toy may have metallic clamps or jaws affixed to them, and in this way receive and retain the several parts or pieces together.

Figure 4:
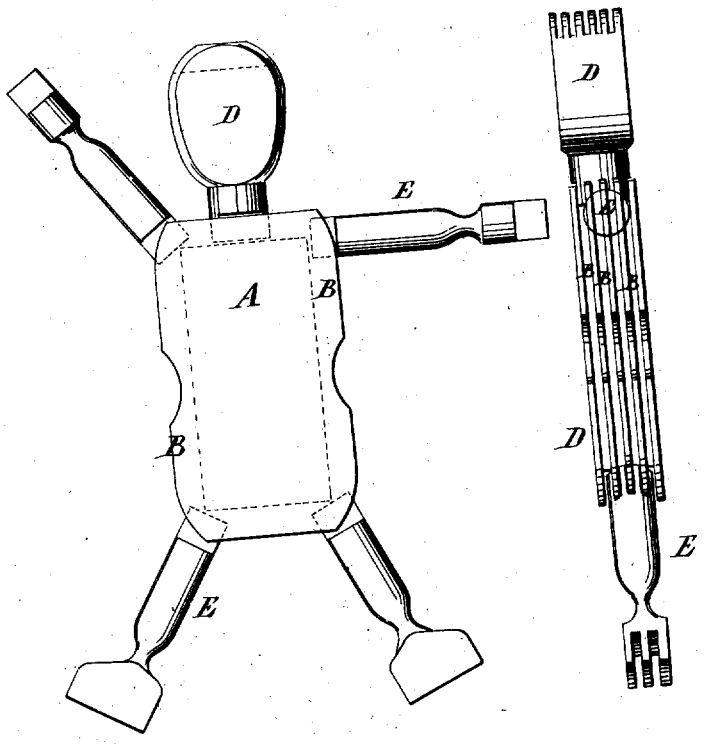

It is obvious from the foregoing description that blocks of any size or form may be fitted or placed together in any desired combination, the square or rectangular blocks forming houses, steamboats, windmills, sleds, and very many other counterfeit representations of real objects in art, and the irregular-shaped blocks or pieces shown at D and E, Fig. 4, admitting of a combination and arrangement that will represent men in a variety of grotesque positions, not unlike acrobats. Their shape, arrangement, and combination may also represent animals of all kinds, as a menagerie or otherwise. In fact, the various combinations and modifications to which this class of toy is adapted are practically without limit, since the several portions or parts of the toy may be made to adhere to the other portions of the same interchangeably and at any angle or position desired, each part remaining fixed to the other, as before described, the parts so adhering together admitting of the structure, whatever it may be, man or animal, to be easily moved from place to place without disarranging the several adhering parts.

Having now described my invention, what I claim as new, and desire to secure by Letters Patent, is—

1. As a new article of manufacture, children's building-blocks or other toys, constructed with interchangeable mortise-and-tenon joints, substantially as described, so that the several parts of the toy, irrespective of size or shape, may be fitted together and retain any desired position or combination by the clamping or friction caused by one part fitting or entering into another part, substantially as and for the purpose set forth.

2. Children's toys provided with one or more jaws, grooves, recesses, or similar clamping devices, within which corresponding tongues, tenons, or other projections of the toy are fitted, and retained in position by friction alone, substantially as described, so that a given combination and arrangement of the several parts is maintained, as specified.

CHAS. M. CRANDALL.

Witnesses:
W. W. SMITH,
J. H. WILLIAMS.